June 24, 1958  R. G. SHAW ET AL  2,840,809
MEANS AND TECHNIQUES FOR INDICATING
SCAN ANGLE AND ANTENNA BEAM
Filed May 22, 1953  3 Sheets-Sheet 2

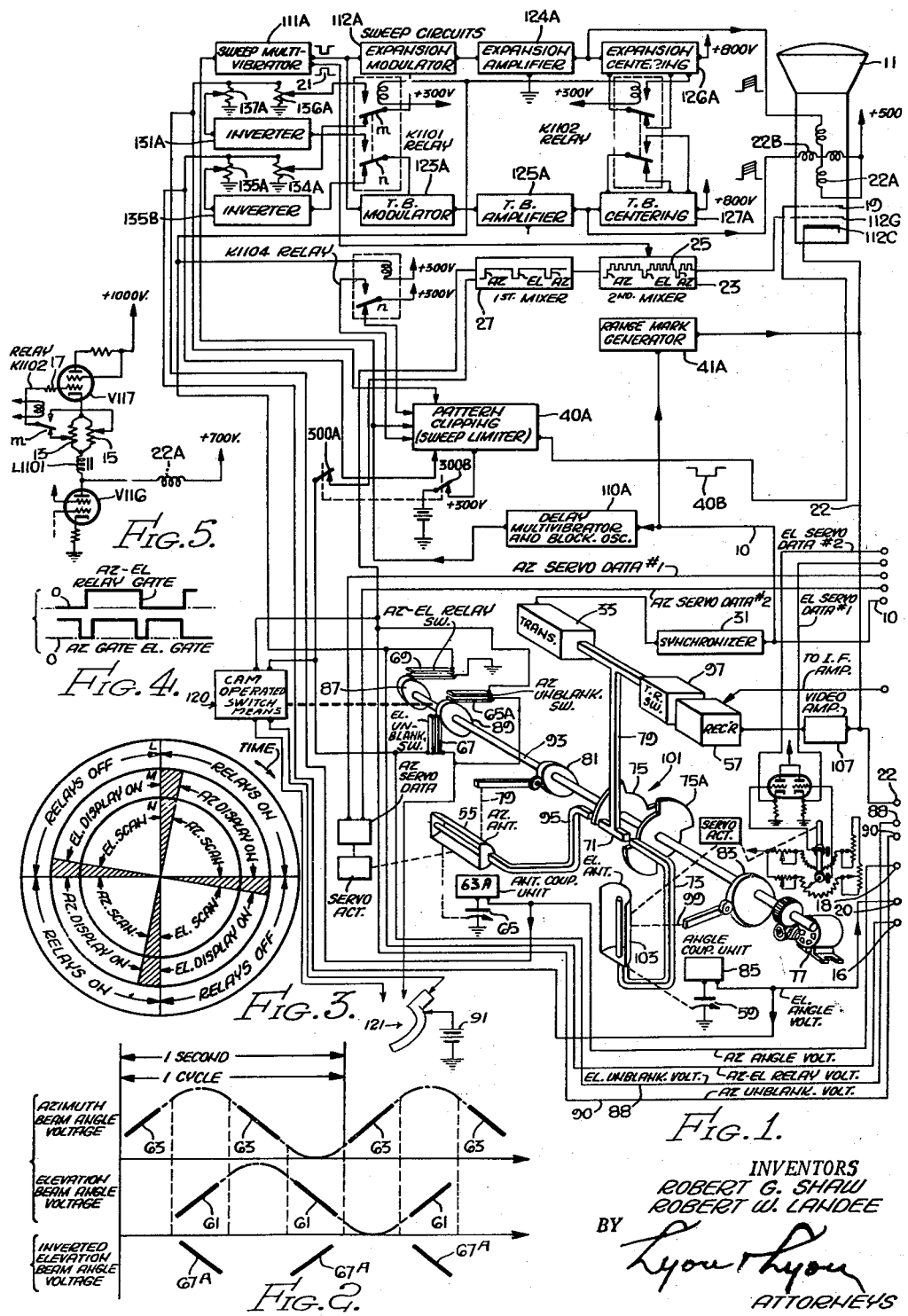

INVENTORS
ROBERT G. SHAW
ROBERT W. LANDEE
BY
Lyon & Lyon
ATTORNEYS

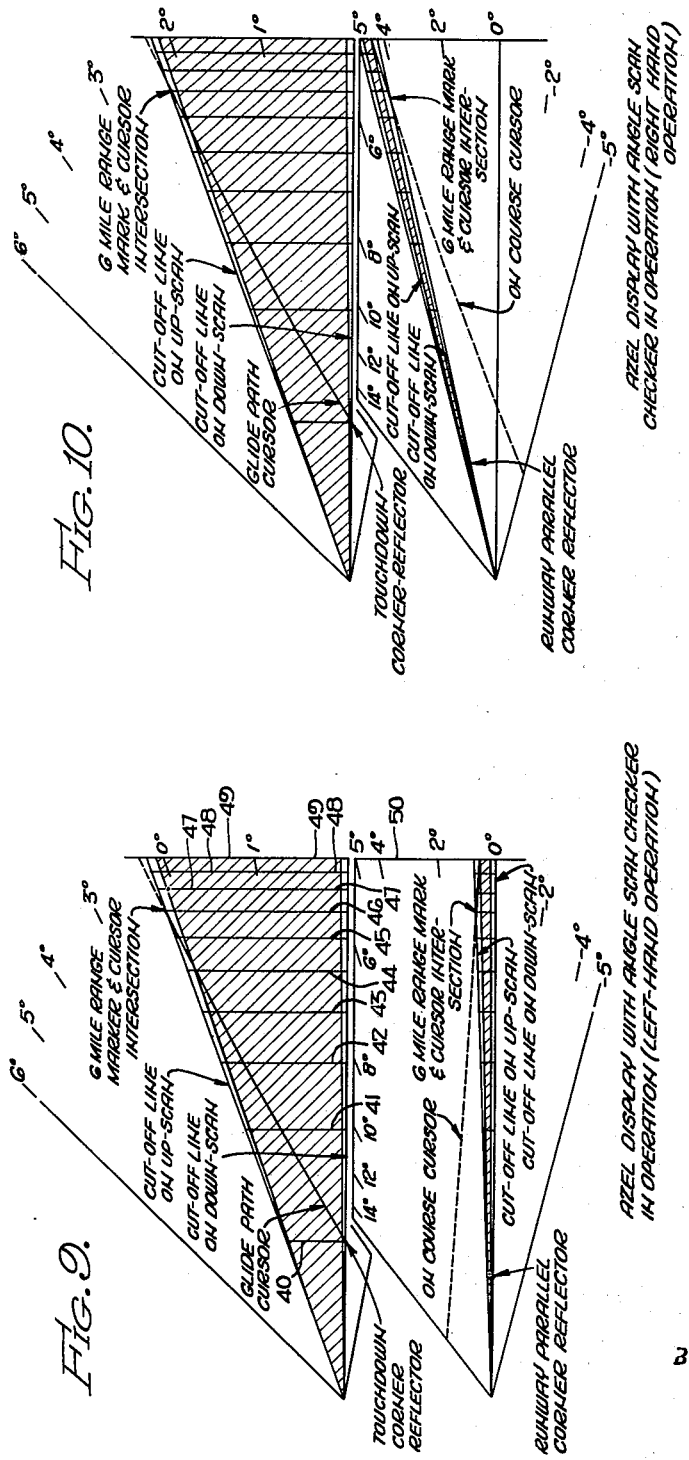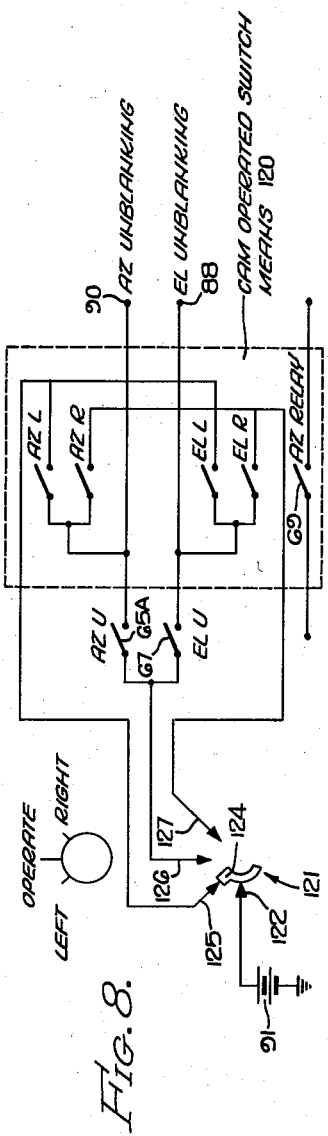

United States Patent Office 2,840,809
Patented June 24, 1958

2,840,809

MEANS AND TECHNIQUES FOR INDICATING SCAN ANGLE AND ANTENNA BEAM

Robert G. Shaw, Los Angeles, and Robert W. Landee, Santa Monica, Calif., assignors to Gilfillan Bros., Inc., Los Angeles, Calif., a corporation of California Application May 22, 1953, Serial No. 356,720

8 Claims. (Cl. 343—11)

The present invention relates to means and techniques whereby the angular scan of an antenna beam in a radar system may be indicated on the associated cathode ray tube display in relationship to other data or information therein.

In a ground controlled approach (GCA) system wherein observations or measurements are made as to the relative position of an aircraft, while landing, with respect to a predetermined glide path (in the elevation vs. range display) and simultaneously with respect to a predetermined on-course line (in the azimuth vs. range display), it is desirable, for test, checking, and/or alignment purposes, to accurately determine and indicate the angular scan of the radiated antenna beam on the corresponding display relationship to other data presented on such display.

It is therefore a general object of the present invention to provide means and techniques for realizing the above desideratum.

A specific object of the present invention is to provide means and techniques whereby the position of the antenna beam may be indicated on the azimuth display while simultaneously the position of the elevation antenna beam may be indicated on the elevation display in a GCA system to indicate one or more conditions.

Another specific object of the present invention is to provide means and techniques whereby the angular scan of the antenna beam in either the azimuth display or the elevation display is correlated with respect to other data on such displays, such as range marks and/or glide path and/or on-course line.

Another specific object of the present invention is to provide improved means and techniques which allow convenient alignment and checking of the operation of a GCA system.

Another specific object of the present invention is to provide improved means and techniques which allow checking and/or alignment of the antenna system and/or cursor (which produces such glide path and on-course line), and/or range mark generator.

Another specific object of the present invention is to provide means and techniques of this character with sufficient reliability and accuracy in relationship to the data and indications which are to be checked and/or aligned.

Another specific object of the present invention is to provide means and techniques of this character which are simple and easy to adjust and maintain in adjustment.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 shows in schematic form apparatus for scanning the approach zone of an aircraft landing field with related circuitry for producing a visual indication of the character illustrated in Figure 6, wherein an angular scan of the radiated antenna beam is indicated and related with other data thereon in accordance with the present invention;

Figure 2 shows azimuth beam angle voltage, elevation beam angle voltage, as well as inverted elevation beam angle voltage, and their variations with respect to time as developed by the apparatus shown in Figure 1;

Figure 3 shows a cycle of operation of the radar scanning and indicating arrangements in Figure 1 and serves to illustrate the period during which the az-el relay voltage is available, the various conditions and their interrelationship being portrayed graphically in a general sense which is considered sufficiently accurate for the purpose at hand;

Figure 4 illustrates other voltages developed during cyclical operation of the apparatus illustrated in Figure 1;

Figure 5 illustrates more detail of the cathode beam centering means shown in block form in Figure 1, such circuitry being effective to shift the displays in Figure 6 sequentially from one origin position O–1 to the other origin position O–2 and from O–2 to O–1, etc.;

Figure 7:
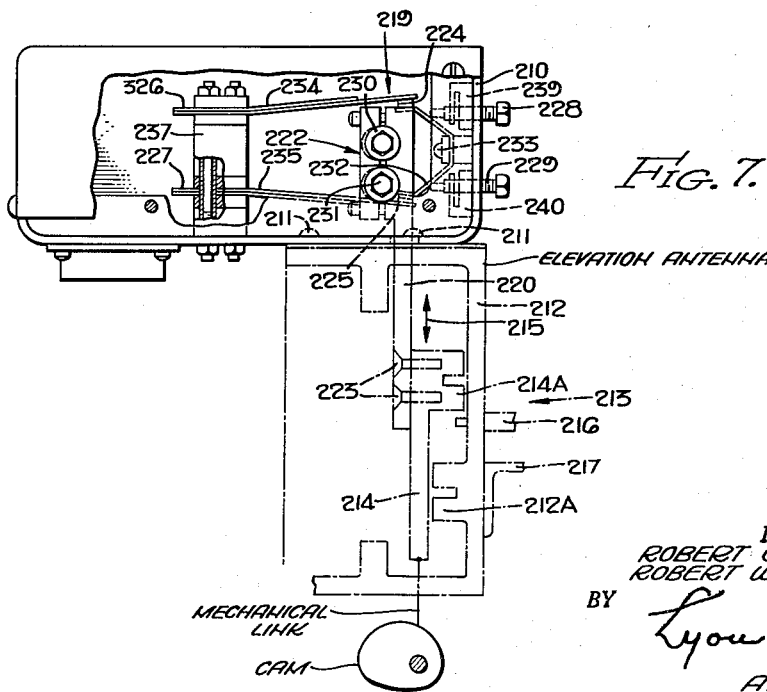

Figure 7 is a view in end elevation of a composite switch associated with one of the variable wave guide radar antennas which is preferably used in the GCA system shown in Figure 1, certain parts of the structure shown being broken away and fragmented for purposes of more clearly illustrating internal structure. It is understood that two such composite switches are provided, one mounted on the elevation antenna and the other mounted on the azimuth antenna, and that each composite switch, in fact, incorporates four switches, each substantially the same as that particular switch shown in Figure 7, as described and claimed in the copending patent application of Romar E. Stein, Serial No. 212,098, filed February 21, 1951, now Patent No. 2,684,410, and assigned to the same assignee;

Figure 8 is a schematic wiring diagram showing the manner in which the four switches in each of the composite switches mounted, respectively, on the azimuth antenna and elevation antenna, as shown in Figure 7, are interconnected so that either normal displays of the character illustrated in Figure 7 are produced, or displays of the character illustrated in Figures 9 and 10 are produced, depending upon the position of the three-position manually operated switch therein; and Figures 9 and 10 each show corresponding azimuth and elevation displays when the equipment is placed respectively to the left of the aircraft runway and to the right of the aircraft runway as viewed by the pilot of an incoming aircraft, it being understood that the manually operated three-position switch in Figure 8 is placed in the left position when the equipment is to the left of the runway to produce the display shown in Figure 9; and, likewise, that the same three-position switch in Figure 8 is placed in the right position when the equipment is to the right of the runway to produce the display shown in Figure 10.

In Figure 1, the synchronizer 31 serves to generate timing pulses which are used to time the application of pulses to the transmitter 33 to initiate its operation. The transmitter stage 33, pulsed at a constant repetition rate of, for example, 1833 or 5500 pulses per second, consists of, for example, a magnetron oscillator with a characteristic frequency of about 10,000 megacycles per second. The output of the transmitter stage 33 is transferred to either the elevation (el) antenna 103 or the azimuth antenna 55, depending upon the position of the motor driven interrupter or radio frequency switch 101. The transmit-receive (T–R) switch 97 prevents power from the transmitter 33 from being applied directly to the receiver 57. This transmit-receive switch 97, as is well known in the art, allows low intensity signals, such as a train of resulting echo signals received on the antennas 103, 55, to be transferred to the input terminals of the receiver 57. This deflection of energy from the transmitter 33 to the antennas 55, 103, accomplished by operation of switch 101, occurs at a rate of approximately two per second so that, in effect, the component antennas obtain four "looks" per second of the space scanned.

The resulting antenna beams are caused to move angularly, i. e., to scan upon rotation of the shaft 93. The switch 101 is rotated once per second, and while energy is being transmitted to one of the antennas 55, 103, the resulting electromagnetic beam projected into space is caused to scan such space. The means whereby such scanning movement of the projected electromagnetic beam is obtained is preferably of the type described in the copending application of Karl A. Allebach, Serial No. 49,910, filed September 18, 1948, now Patent No. 2,596,113, for bridge type precision antenna structure, which depends for its operation on the use of a variable wave guide type of antenna. This particular means, per se, forms no part of the present invention and, so far as the aspects of the present invention are concerned, the antenna scanning beam may be produced by moving the entire antenna through a relatively small arc of a circle. Actually, in fact, the azimuth antenna beam may scan first in one direction and then in the other, waiting after each scan while the elevation beam completes a scan in elevation. The azimuth antenna 55 scans a fixed horizontal angle of 20° and is so placed as to include the approach course to a given airfield runway. Vertical scan of the elevation antenna 103 is from minus one degree to plus 6 degrees.

While in any position during the part of the cycle in which the radio frequency switch 101 allows the flow of energy into the elevation antenna 103, the elevation antenna beam is electrically scanned in elevation. The position of the elevation antenna beam is measured by means of a variable capacitor 59, one plate of which is attached to the beam scanner of elevation antenna 103 and varied in accordance therewith, such capacitor 59 comprising one part of a capacitative potentiometer and contained in the angle coupling unit 85 which may be of the type described and claimed in the copending patent application of Clarence V. Crane, Serial No. 212,114, filed February 21, 1951, now Patent No. 2,650,358. The angle coupling unit 85 thus used with capacitor 59 is useful in developing the elevation beam voltage represented as 61 in Figure 2.

Similarly, the angle in azimuth of the radiated azimuth antenna beam is measured by the angle capacitor 65 in the azimuth angle coupling unit 63A, operating synchronously with the scanner of the azimuth antenna 55. Such variation in azimuth angle voltage as a function of the particular angular position of the azimuth antenna beam is represented by cyclically varying voltage 63 shown in Figure 2. It is observed that these voltage variations Nos. 61 and 63 have portions thereof shown in heavy lines, and it is these portions which are used to effect control operations and which are selected by means mentioned later. Figure 2 also shows inverted elevation beam angle voltage, as represented by the oblique lines 67A.

Also coupled to the scanner of the elevation antenna 103 is the elevation unblanking switch 67, which has one of its terminals connected to the continuous voltage source 91 for purposes of developing an elevation unblanking voltage gate, shown in Figure 4, so timed that its positive value corresponds to the time of effective scanning of the elevation antenna beam. The azimuth unblanking switch 65A is similarly coupled to the scanner of azimuth antenna 55 with one of its terminals connected to the continuous voltage source 91 for purposes of developing azimuth unblanking voltage (Fig. 4) so timed that the positive portion of such voltage corresponds to the time of effective scanning of the azimuth antenna beam. Relay switch 69 operates at substantially the same time as switch 65A, and synchronously therewith, and serves to generate the so-called az-el relay voltage or gate (Fig. 4), which is so timed that its positive portion begins at a time just prior to the beginning of the azimuth unblanking voltage and just after the end of elevation unblanking voltage, and which ends at a time just after the ending of the azimuth unblanking voltage and just prior to the beginning of the elevation unblanking voltage, all as seen in Figure 4.

Figure 3 shows a schematic diagram of the time relations involved in a scanning action which typically occupies a time in the order of one second. Forward progress of time is represented by clockwise motion about this diagram. The central circular region of Figure 3 marked N shows the time schedule of the scanning operations of the two systems, opposite quadratures being scanned by the same system but carried out in opposite directions. The shaded area (each comprising approximately 10 degrees of the complete 360 degrees cycle) represent the periods during which the transmitter 33 is switched by the switch 101 in Figure 1 from one antenna to the other antenna. Unshaded areas of region N represent the time periods during which one or the other of the antennas is in use, sending out radio frequency pulses and received reflected echo signals from objects within the field of coverage of the beam. Shaded areas indicate inactive periods during which switching takes place, both antennas being momentarily isolated from the transmitter and receiver.

The inner annular region M of Figure 3 represents the time schedule of the related azimuth and elevation displays, subject however to pattern clipping described later, and corresponds to the cyclical variations of azimuth and elevation voltages represented in Figure 2. In accordance with certain features of the present invention, the inner annular region M of Figure 3 is changed, as described hereinafter, for purposes of indicating a predetermined angular scan of the antenna beam. In this respect, only the region M is changed.

The outer annular region of Figure 3 marked L shows the time schedule of currents through the various coils of a number of so-called az-el switching relays for effecting time sharing. The relay actuating current is obtained by the switch 69 (Figure 1) operating in synchronism with the mechanism producing azimuth antenna beam scanning.

More specifically, in Figure 1, the wave guide transmission line 79 leads from the transmitter 33 and receiving system 97, 57. A T-joint 71 divides this transmission line into two branches 73 and 95, leading through switch assembly 101 to the elevation and azimuth assemblies 103 and 55, respectively. These branches have suitably placed shutter slots which receive the rotating shutters 75 and 75A, respectively. These are mounted on the common drive shaft 93, driven by the motor 77, and have two blades each arranged in opposite fashion so that, when one antenna transmission branch is opened, the other will be blocked by its shutter. The shutter blades cover angles of approximately 100 degrees, leaving openings of 80 degrees as required by region N of Figure 3.

As mentioned previously, the same drive shaft 93 operates the two antenna beam scanning mechanism represented by the dotted lines 99, 79A, and assumed to be of the same construction as in the abovementioned Allebach application and built into the antenna assemblies. In the showing of Figure 1, the eccentric cams 83, 81 on shaft 93 operate the same scanning mechanism. Since each of the cams 83, 81 has one lobe, while its associated shutter 75A or 75 has two lobes, one opening in the shutter will find the antenna scanning in one direction, the other in the opposite direction. The azimuth and elevation unblanking switches 65A and 67 are shown schematically in Figure 1 as being cam actuated, being operated by the two-lobed cam 89, for purposes of establishing the unblanking or intensifying voltages represented in Figure 4 but are preferably of the character described hereinafter.

The az-el relay switch 69 is operated by the cam 87 on shaft 93 to control current to the circuit switching relays, the junction of which is described hereinafter. Preferably, this switch is of the character described hereinafter.

Radar echo signals, when received at the elevation antenna 103 or the azimuth antenna 55, as the case may be, are fed back into the switch 101 and passed through the T-R switch 97 into the receiver 57. Receiver 57 serves to detect the video and, after the video is amplified in the video amplifier stage 107, it is applied as so-called normal video to the lead 22 in Figure 1. Such video, i. e., radar video, derived from echo signals is applied directly to the cathode of the cathode ray tube 11 shown in Figure 1 for purposes of producing visual indications.

The cathode ray tube 11 in Figure 1 has a pair of magnetic deflection coils 22B, 22A, so arranged as to deflect the associated electronic beam substantially parallel to two mutually perpendicular axes, i. e., the so-called "time base" axis which is generally although not exactly horizontal, as viewed by the operator, and so-called "expansion" axis which is generally vertical. In general, each basic trigger pulse developed in synchronizer 31 (Figure 1) is made to initiate a current wave of sawtooth form through the time base deflection coil 22B and a current wave of similar form through the associated expansion deflection coil 22A. This variation is logarithmic in character, as described in the copending application of Homer G. Tasker, et al., Serial No. 175,168, filed July 21, 1950, now Patent No. 2,737,654, and assigned to the same assignee as the present application.

The resulting rate of such sawtoothed current is of course the same as, or a fractional multiple of, the pulse repetition rate of the transmitted radar pulses and occurs during the expectant period of resulting echo signals.

Such sawtooth currents applied to the deflection coils 22B, 22A, however, are "modulated" at a much lower rate by voltages of much lower periodicity which are produced by the aforementioned beam angle voltages shown in Figure 2. Those portions of the voltage indicated in heavy lines in Figure 2 only are used to modulate the aforementioned currents on a time sharing basis.

These voltages, as represented by the curves 61, 63, may vary from plus 2 volts at one extreme of the scanning range to plus 52 volts at the other end. These particular antenna beam angle voltages, as mentioned previously, are used in effect to "modulate" an amplitude of the sawtooth current waves developed within the sweep circuits shown in Figure 1 and applied to the expansion coil 22A, for purposes of obtaining so-called unidirectional or unidimensional magnitudes in the cathode ray display, in accordance with the principles set forth in the copending application of Homer G. Tasker, Serial No. 680,604, filed July 1, 1946, now abandoned, and assigned to the same assignee as the present application. On the other hand, the amplitude of the sawtooth voltage waves developed at the sweep amplifier and applied to the other quadraturely acting timing based coil 22B is likewise modulated to a much smaller degree and in a different manner, for purposes of orientation. Thus, the amplitude of the currents applied to coil 22A is automatically varied in accordance with antenna beam angle voltage, so that the angle which any particular cathode ray beam makes corresponds, on an expanded scale, to the antenna beam voltage.

The tube 11 is rendered fully operative for producing visible indications only when a suitable intensifying voltage is applied to its grid 112G, bringing the tube approximately to cut-off condition. A relatively small additional video signal applied to the cathode 112C then strengthens the cathode beam, making it momentarily visible on the screen as a dot, the position of which is determined by the currents flowing at that particular moment in the set of deflection coils 22A, 22B.

For purposes of developing the aforementioned suitable deflecting currents in the cathode ray deflection coils 22A, 22B, the sweep generating circuit shown in Figure 1 is supplied with basic triggers originating in the synchronizer 31 and applied to lead 10. Such trigger is applied to the delay multivibrator and blocking oscillator stage 110A, the output of which is fed to the sweep generating multivibrator stage 111A. A negative gating voltage is generated in the stage 111A and fed to the expansion and time base modulator stages 112A, 123A, respectively, and from them in modulated form through the expansion and time base amplifiers 124A, 125A. The output of the amplifiers 124A, 125A in the form of essentially trapezoidal waves of appropriate amplitude is applied to the expansion deflection coil 22A and the time base deflection coil 22B, respectively, causing current pulses in the coils. Expansion and time base centering circuits 126A, 127A, are also connected to the deflection coils. The modulator stages 112A, 123A, for purposes of modulation, receive az-el antenna beam angle voltages via switches m and n, respectively, of relay K1101.

With the relay unactuated (as shown) the elevation beam angle voltage appearing on the potentiometer resistance 134A is applied through switch m to the expansion modulator 112A; and through potentiometer resistance 135A and inverter 135B and switch n to the time base modulator 123A. After completion of the elevation scan, relay K1101 is energized through switch 69 breaking the elevation beam angle voltage connections just described, and connecting the azimuth beam angle voltage through potentiometer 136A and switch m to the expansion modulator 112A; and through potentiometer 137A, inverter 131A and switch n to the time base modulator 123A.

Figure 6:
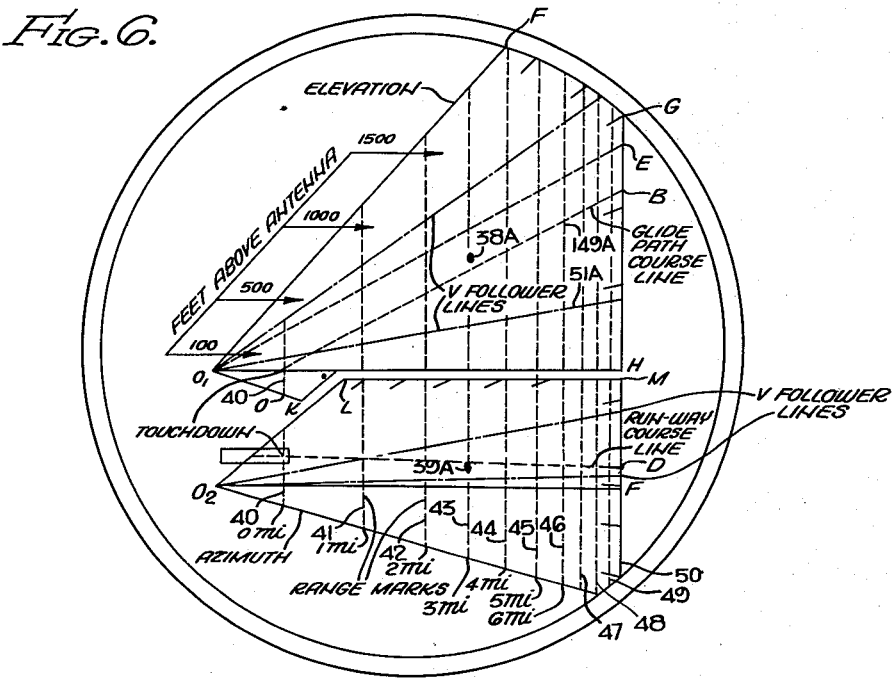
Figure 6 illustrates the display obtained using the apparatus illustrated in Figure 1, the elevation and azimuth displays being produced sequentially on a time sharing basis.

Thus, the degree of modulation of sweep current and hence the degree of angle expansion of the display shown in Figure 6 may be separately regulated for the azimuth display by adjustment of the potentiometer 136A, and for the elevation display by adjustment of the potentiometer 136A; and the degree of modulation of the time base sweep current, and hence the apparent angle between the range marks and the time base may be separately regulated for the azimuth display by adjustment of potentiometer 137A, and for the elevation display by adjustment of the potentiometer 135A.

The centering circuits 126A, 127A in Figure 1 are individually capable of two separate adjustments, one effective when relay K1102 is actuated (azimuth display) and one when the relay is unactuated (elevation display) to determine the position of the points $O_2$, $O_1$, respectively, in Figure 6. Thus, the origins of azimuth and elevation displays are separately adjustable, the centering circuits automatically responding to one or the other set of adjustments according to the energizing condition of relay K1102. A schematic diagram showing a centering circuit for this purpose is shown in Figure 5.

The deflection coil 22A in Figure 5 is connected between a 700-volt positive supply and two parallel circuits, one leading to ground through tube V-1116, which is the final stage of expansion amplifier, and the other returning through choke coil L1101 and centering tube V-1117 to a 1,000-volt positive supply. The first of these two circuits feeds to deflection coil 22A, the periodically varying sweep producing component, while the second circuit provides a relatively constant but adjustable centering current component. The cathode resistor of centering tube V-1117 is made up of two parallel connected potentiometers 13 and 15, the movable contacts of which are connected respectively to the normally closed and normally open contacts of switch *m* of relay K1102. A switch arm is connected through grid resistor 17 to the tube grid. The grid bias, and hence the centering current through the tube and through the coil 22A thus depends upon the position of relay switch *m* and is determined by the setting of the potentiometer 15 when relay K1102 is actuated (azimuth display) and by the potentiometer 13 when the relay is not actuated (elevation display). The two displays are therefore separately adjustable on the indicator tube by means of the two potentiometers.

The time base deflection coil 22B is provided with centering circuit which is identical to that in Figure 5 and functions in a like manner, controlled by switch *n* of relay K1102. In fact, by appropriate changes of the numerals and lettering, Figure 5 may be considered to illustrate the time base centering circuit. The potentiometers then provide separately adjusted ordinary elevation and azimuth displays with respect to the horizontal positions.

It is noted that the preferred interrelationship of the two displays in Figure 6 is such that the series of corresponding range marks of the two patterns lie in a straight line so that the two aircraft images 38A, 39A always lie in a line just parallel to the range mark lines, one directly above the other.

The azimuth and elevation displays shown in Figure 6 are limited so that they appear as shown, such pattern clipping or limiting being produced by operation of the pattern clipper or limiter 40A shown in Figure 1. Such sweep limiter 40A forms, per se, no part of the present invention and may be the one described and claimed in the copending patent application of Raymond B. Tasker, Serial No. 212,163, filed February 21, 1951, now Patent No. 2,663,868, and assigned to the same assignee. In general, the output of sweep limiter stage 40A is a negative-going gating voltage 40B applied to the first anode 19 of the cathode ray tube 11. Such negative-going gating voltage 40B is used for darkening, i. e., blanking out, the indications which may be otherwise visible. Such blanking occurs during undesired periods of sweep, as now described specifically.

The azimuth display, which is preferably the lower one, is blanked or clipped or limited, above a horizontal line LM. In the elevation (upper) display, a section is cut out or clipped, such section being to the right of a short generally inclined line KJ. This line KJ is located just to the left of and parallel to the upper limiting sweep path O₂L of the lower azimuth display.

As shown in Figure 1, the input to the sweep limiter 40A is: (1) a trigger derived from the basic trigger appearing on lead 10; (2) the azimuth and elevation angle coupling voltages on leads 18 and 20, respectively; and (3) the az-el relay voltage on lead 16. It is understood that this negative gating voltage 40B appears at variable times along the time axis depending upon the magnitude of either the azimuth or elevation beam angle voltage, whichever one at that particular time is effective.

The purposes of the switches 300A, 300B shown in Figure 1 are fully described in the abovementioned application of Homer G. Tasker and, for the present instance, may be considered to remain closed.

It is observed further in connection with Figure 1 that the sweep multivibrator 111A generates a positive-going gating voltage 21 of a duration substantially equal to the time duration of the cathode beam sweep and such positive-going gating voltage is applied to the second mixer stage 23 to produce the waveform 25. This wave 25 comprises pulses of sweep frequency added to the longer azimuth and elevation gates which are developed in the first mixer stage 27 and shown also in Figure 4. This composite wave 25 is applied to the cathode ray grid 112G, bringing the tube up to the point of cut-off during each sweep. By this expedient, the cathode ray tube is conditioned for producing visual indication only during those times when video signals are being expected.

The range marks 40, 41, 42, 43, 44, 45, 46, 47, 48, 49 and 50 shown in Figure 6 are developed by the range mark generator 41A (Figure 1) in accordance with basic triggers applied to such stage from lead 10. The range marks developed in stage 41A are applied to the cathode 112C.

Also, Figure 6 shows the glidepath course line 149A and runway course line. These two course lines may be developed electronically by apparatus described and claimed in the copending application of Raymond B. Tasker and Burton Cutler, Serial No. 222,512, filed April 23, 1951, and assigned to the same assignee.

In accordance with an important feature of the present invention, the duration of the az gate and el gate shown in Figure 4 is altered in a predetermined manner to obtain either the display shown in Figure 9 or Figure 10. The means whereby this is accomplished is indicated in Figure 1 as the "Cam Operated Switch Means" 120 which has its input circuit connected through the three-position switch 121 to the source 91 and which has its output connected to leads 88 and 90. This circuitry 120 is illustrated in Figure 8 and uses two of the composite switches illustrated in Figure 7, i. e., one composite switch for the elevation antenna and one composite switch for the azimuth antenna. It is understood that each composite switch, in fact, includes four switches of the character shown and described in the abovementioned application of Romar E. Stein. The switches in the azimuth composite switch are prefixed by the letters AZ whereas the switches in the elevation composite switch are prefixed by the letters EL. Further, the letter L refers to left runway operation, while the letter R refers to right runway operation. The letter U refers to unblanking generally with the switches AZU and ELU thus corresponding to the switches 65A and 67, respectively. Likewise, the switch 69 shown in Figure 1 is preferably one of the four AZ switches and is designated as such in Figure 8, namely as the AZ Relay switch. It is noted that each of the switches AZL, AZR, ELR, ELL and AZ Relay is individually adjustable at both ends of travel of the associated common actuating member illustrated and as now described in connection with Figure 7.

Referring to Figure 7, the switch casing, housing or base 210 is firmly mounted as, for example, by releasable bolts 211 to the stationary wave guide element 212 of the radar antenna 213 which is representative of both the elevation and the azimuth antennas. The other wave guide element 214, which cooperates with the stationary guide element 212, is oscillated vertically in Figure 7, as indicated by the arrows 215, by the cam 81 or 83 (Figure 1), as the case may be. The effect of such oscillatory movement represented by the arrows 215 is to cyclically vary the spacing, i. e., the so-called A-dimension, defined by the operation of the legs 212A, 214A on the stationary and movable guide members, respectively. By thus cyclically varying the spacing, i. e., the so-called A-dimension, a scanning movement is imparted to the highly directional antenna beam radiated by a series of dipoles 216, each of which is mounted on the guide member 212 with a probe thereof extending into the variable width wave guide defined by the legs 212A, 214A. The stationary guide member 212 may have mounted thereon a longitudinally extending parasitic reflector 217.

Each switch of which there are four in number, disposed in side-by-side relationship in the casing 210, is operated in timed relationship with movement of the variable wave guide member 214, and the time during which it is operated, as described in detail hereinafter, may be adjusted with respect to either end of travel of the guide member 214, and further may be adjusted to remain closed during any selected period corresponding to a selected period of travel of the guide member 214. For purposes of actuating the switch, which has the general reference numeral 219 (such switch 219, in fact, comprising eight switches arranged in pairs as described hereinafter), a pair of upwardly extending arms 220 (Figure 7) is interconnected between the movable guide member 214 and the movable portion 222 of the switch 219. The lower ends of these arms 220 are releasably fastened to the guide member 214 by machine bolts 223.

Actually, the switch 219 includes four identically constructed switches 224, 224, 224, 224 in the upper deck (Figure 1) and four identically constructed switches 225, 225, 225, 225 in the lower deck. Corresponding ones of such switches 224, 225, as shown in Figure 7, are serially connected to an upper deck terminal 226 and a lower deck terminal 227.

Briefly, the upper deck switch 224 is actuated in upward movement of the guide member 214, and the lower deck switch 225 is actuated in downward movement of the guide member 214, and the point at which the switches 224, 225 are operated, i. e., opened, with respect to the upper and lower limits of travel of the guide member 214, may be adjusted by corresponding upper and lower deck adjustment screws 228 and 229. Since there are four upper deck switches 224, there are four corresponding adjustment screws 228, and likewise there is an adjustment screw 229 for each of the four lower deck switches 225. Further, by adjusting the angular position of the upper cam 230, each of the upper deck switches 224 may be adjusted in unison; likewise, by adjusting the angular position of the lower cam 231, each of the lower deck switches 225 may be adjusted in unison.

It is observed, with reference to Figure 7, that each of the switches 224, 225 has a common element, namely, the generally V-shaped spring element 232 which is affixed to the housing 210 by bolt 233 with contact elements mounted on each of its free ends, such contact elements cooperating with like contact elements mounted on the insulated leaf springs 234, 235. These leaf springs 234, 235 are mounted on the post 237 of insulating material, which is bolted to the casing 210 with projecting ends of such leaf springs 234, 235 providing terminals 226, 227. It is observed that the V-shaped switch spring element 232 is insulated from the casing 210.

It is observed that the free ends of the V-shaped spring switch element 232 cooperate with the rounded reduced ends of the adjustment screws 228, 229 in such a manner that corresponding free ends may be adjusted physically with reference to the corresponding spring elements 234, 235 whereby the point at which the switches 224, 225 are operated, i. e., opened, with respect to upper and lower movement of the arm 220, may be adjusted. Various means may be used to lock the adjustment screws 228, 229 in their adjusted position, and such means, since they are preferred, are shown herein as locking plates 239, 240 which cooperate with the shanks of the screws 228, 229, respectively, to secure the same against movement.

The switches 224, 225 actually are both normally closed switches, and switch 224 is caused to be opened upon engagement of the cam 230 with the spring element 234; similarly, the switch 225 is opened upon engagement of the cam 231 with the spring element 235. Both of these cam members 230, 231 have their opposite ends supported on the upper ends of the arms 220, 220, one end of these cams 230, 231 being slip-fitted into one of the arms 220, whereas the other end of these cams 230, 231 is locked to the other arm 230 by a clamping plate 241, the opposite ends of which are bolted to the arm 220 so as to clamp each of the cams 230, 231 between the plate 241 and the upper end of such arm 220.

Each of these cams 230, 231 may comprise simply an insulating rod with a smaller rod passing through an eccentrically located bore in the larger rod, and with both the larger and smaller rods affixed together, as for example, by a pin or set screw. Such smaller rod has one of its ends provided with a hexagon head and screw driver adjustment slot, so that the assembly comprising such larger and smaller rods may be rotated to different adjusted positions once the clamping plate 241 is released.

It is evident that adjustment of the cam 230 affects the time at which each of the upper deck switches 224 is operated; similarly, adjustment of the lower cam 231 affects the time at which each of the lower deck switches 225 is operated.

Different electrical circuits connected to terminals 226, 227 are thus normally closed in intermediate position of the oscillatory wave guide member 214 which, as mentioned previously oscillates in the direction indicated by the arrows 215 in Figure 7. It is only when the guide member 214 is moved towards either one of its extreme positions that either switch 224 or 225, as the case may be, is interrupted to thereby interrupt such electrical control circuit which includes, for purposes of reference, the terminal 226, switch element 224, switch element 225 and terminal 227. It is obvious from the foregoing description that the point at which the switch 224, 225 is operated with reference to the angular position of the antenna beam radiated from the antenna 213 may be adjusted individually by corresponding adjustment screws 228, 229 which are thus capable of providing an adjustment of the character described hereinafter which interrelates a portion of the scan angle of the antenna beam with the display and more particularly with the range marks and cursor lines.

After once installing the composite switch 219 on the wave guide antenna 213, the individual switches 224, 225 are adjusted by adjustment of the corresponding adjustment screws 228, 229. Later, when it is desired to install the same switch on a different antenna of the same novel dimensions, or to reinstall the same switch on an antenna after it has been repaired, or, more important, upon replacement of a magnetron, adjustment of each of the switches 224 or 225 in unison may be effected by adjustment of the corresponding cam 230, 231, thereby avoiding the necessity of adjusting each of the screws 228, 229 individually.

In Figure 8, the three position switch 121 has its contact 122 always connected to one terminal of source 91. The contact 122 makes connection alternately with contacts 125, 126, 127 corresponding respectively to "Left," "Normal" or "Right" operations. Contact 125 is connected to one terminal of switches AZL, ELL, the other terminal of switch AZL being connected to lead 90 and the other terminal of ELL being connected to lead 88.

Contact 126 is connected to one terminal of switches AZU(65A), ELU(67), the other terminal of switch AZU being connected to lead 90 and the other terminal of switch ELU being connected to lead 88.

Contact 127 is connected to one terminal of switches ELR and AZR, the other terminal of AZR being connected to lead 90 and the other terminal of ELR being connected to lead 88.

The AZL and ELL switches are adjusted using the means described above to achieve the conditions shown in Figure 9 when the radar equipment is located to the left of the runway. In such case, in the azimuth display the upper boundary of such display represents a line in space which intersects the on-course or runway line extended six miles from touchdown, i. e., a line which passes from a point representing the location of the equipment to the intersection of the six-mile range mark with the on-course cursor line. The lower boundary of the display represents a line in space extending parallel to the runway or on-course line. This latter line is established, i. e., the AZL switch is adjusted, using information obtained from radar reflections from a corner reflector disposed on such parallel line while the former line is established, i. e., the same AZL switch is adjusted to obtain the display which is cut off along a line passing through the aforementioned intersection between the six-mile range mark and the electronically produced on-course line.

In right-hand operation as shown in Figure 10, the AZR switch is adjusted so that the upper boundary represents the line in space parallel to the runway or on-course line. Likewise the switch AZL is adjusted so that the lower boundary of the display represents the line in space which intersects the runway or on-course line extended six miles from touchdown. Here again the first mentioned line is obtained using information obtained from radar reflections from a corner reflector and/or antenna known settings while the second mentioned line or adjustment is obtained using information on the display or more accurately and effectively the known antenna settings.

In both elevation displays in Figures 9 and 10, the upper boundary represents the line in space which intersects the glidepath at six miles range. These lines may be produced, i. e., the switch ELL in the case shown in Figure 9 and the switch ELR in the case shown in Figure 10 may be adjusted in the first instance using data on the display or more accurately and effectively known antenna settings and in the second instance using reflections from ground based objects such as a corner reflector at touchdown range but off in azimuth from touchdown, thereby eliminating danger to the aircraft so that both extremities of the elevation display may be adjusted and checked in accordance.

What is claimed is:

1. In a system of the character described, first means at an origin position producing an antenna beam and scanning the same through space which includes a reference marker for producing a reference echo signal therefrom, second means operating synchronously with the first mentioned means and normally producing a display of said space with said display having an origin point corresponding to said origin position, echo receiving means coupled to said second means to produce a first reference point in said display, range mark generating means coupled to said second means to produce at least one range mark in said display, cursor generating means coupled to said second means and developing a line in said display intersecting said one range mark to define a second reference point at the point of intersection, third means normally ineffective to blank a first outer portion of said display on the boundary of a line which extends from said origin point to said first reference point and to blank a second outer portion of said display which is on the boundary of a line which extends from said origin point to said second reference point, and switching means interconnected between said second and said third means for rendering said third means effective.

2. In a system of the character described, first means at an origin position producing an antenna beam and scanning the same through space which includes a reference marker for producing a reference echo signal therefrom, second means operating synchronously with the first mentioned means and normally producing a display of said space with said display having an origin point corresponding to said origin position, echo receiving means coupled to said second means to produce a first reference point in said display in accordance with echoes from said reference marker, image producing means coupled to said second means to produce a second reference point in said display, third means, normally ineffective, to blank a first outer portion of said display on the boundary of the line which extends from said origin point to said reference point and to blank a second outer portion of said display which is on the boundary of a line which extends from said origin point to said second reference point, and switching means interconnected between said second and third means for rendering said third means effective, and cursor operating means for developing a reference point.

3. In a system of the character described, first means at an origin position producing an antenna beam and scanning the same through space, second means operating synchronously with the first mentioned means and normally producing a display of said space with said display having an origin point corresponding to said origin position and a first reference point and a second reference point, third means normally ineffective to blank a first outer portion of said display on the boundary of a line which extends from said origin point to said first reference point and to blank a second outer portion of said display which is on the boundary of a line extending from said origin point to said second reference point, and switching means interconnected between said second and third means for rendering said third means effective, and cursor operating means for developing a reference point.

4. In a system of the character described, first means at an origin position producing an antenna beam and scanning the same through space, second means operating synchronously with the first mentioned means and normally producing a display of said space, and switching means connected to said second means and operative synchronously with said scanning means to limit said display to thereby indicate the angular scan and its orientation of the antenna beam in said space, and cursor operating means for developing a reference point.

5. In a system of the character described for indicating the angular scan of an antenna beam and the orientation of the antenna beam in space, means producing an antenna beam and scanning the same through space, means operated synchronously with the first mentioned means and normally producing a display of said space, means producing at least one reference point in said display, and means coupled to the first mentioned means for blanking said display with reference to said reference point, and cursor operating means for developing a reference point.

6. In a system of the character described for correlating electrically produced data in a cathode ray tube display with the angular scan of an antenna beam, the combination comprising means producing an antenna beam for scanning the same through space, means operated synchronously with the first mentioned means and normally producing a display of said space, said scanning means including a variable width wave guide, and switching means actuated by a movable element of said wave guide and connected to the last mentioned means for modifying the same to produce a limited display, the boundaries of which represent the angular scan of said antenna beam, and cursor operating means for developing a reference point.

7. In a system of the character described, a variable width wave guide antenna having a movable element for producing an antenna beam and scanning the same through space, a switch operated by said movable element means operated synchronously with movement of said element for producing a display of said space, and means controlled by said switch and operatively connected to the last mentioned means for modifying the action of the same to produce a limited display representing the angular scan of said antenna beam, and cursor operating means for developing a reference point.

8. In combination, an antenna for producing a beam of electromagnetic energy, first means associated with said antenna for producing a scanning movement of said beam through space, indicating means including second means operating synchronously with said first means for producing a display generally in such space through which said beam is scanned by said first means, third means associated with said first means for producing an indication in said display of at least one of the limits to which said antenna beam is scanned, and manually operative means for rendering said third means ineffective.

References Cited in the file of this patent

UNITED STATES PATENTS

| | | |
|---|---|---|
| 2,459,481 | Wolff et al. | Jan. 18, 1949 |
| 2,585,855 | Sherwin et al. | Feb. 12, 1952 |
| 2,649,581 | Tasker | Aug. 18, 1953 |
| 2,653,313 | Clapp | Sept. 22, 1953 |